D. K. OVERHISER.
SPREADERS FOR WOOD-SAWING MACHINES.
No. 194,259. Patented Aug. 14, 1877.
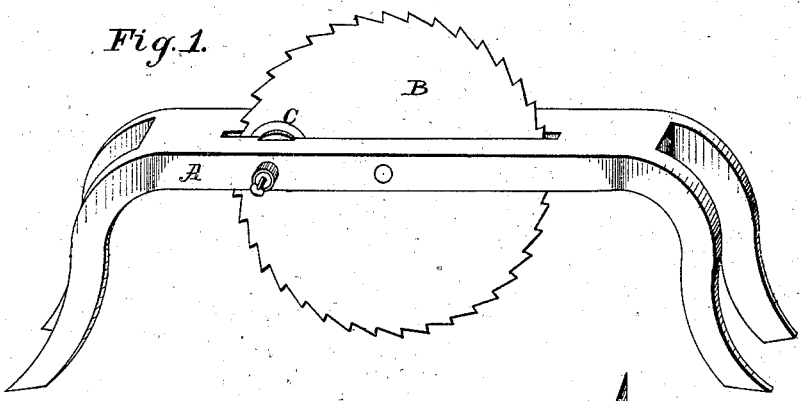
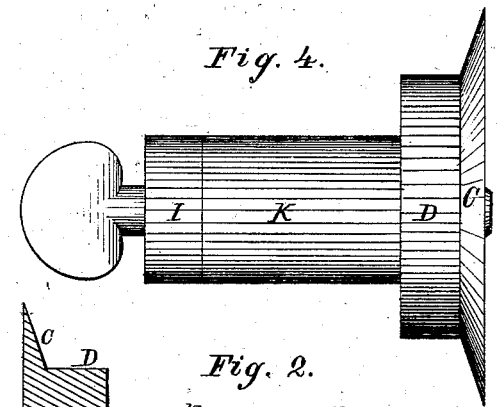
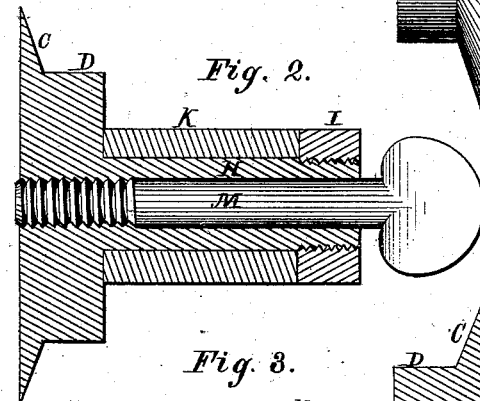
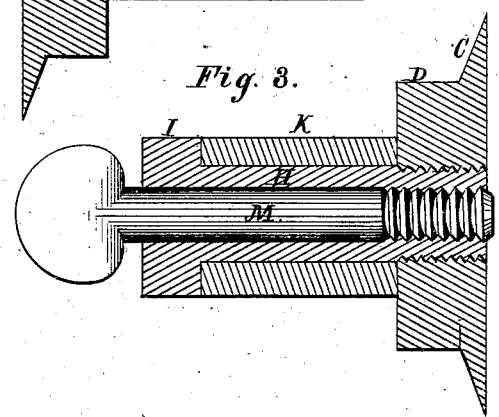
Witnesses:
James O. Parker
B. S. Bentley Jr.
Inventor:
David K Overhiser.

UNITED STATES PATENT OFFICE.

DAVID K. OVERHISER, OF WILLIAMSPORT, PENNSYLVANIA.

IMPROVEMENT IN SPREADERS FOR WOOD-SAWING MACHINES.

Specification forming part of Letters Patent No. 194,259, dated August 14, 1877; application filed March 2, 1877.

*To all whom it may concern:*

Be it known that I, DAVID K. OVERHISER, of Williamsport, county of Lycoming, State of Pennsylvania, have invented an Improvement in Spreader for Sawing-Machines; and I do hereby declare that the following is a full and exact description of the same, reference being had to the accompanying drawing, and the letters of reference marked thereon.

My invention consists in a new device for spreading the wood after it is cut by the saw, and preventing friction by contact with the saw of the cut portions.

My device may be used with any saw, but is especially adapted to a circular saw, and may be arranged to operate in front of as well as behind the saw-mandrel, thus avoiding the difficulty hitherto experienced with spreaders now in use, which, being located entirely behind the mandrel, are much less efficient in spreading the wood and avoiding friction with the saw.

A represents the frame of a sawing-machine; B, the saw suitably hung in the frame, and C the spreading device. It is a circular plate or flange of metal, flat upon the side toward the saw, and so connected with the saw-frame as to be capable of a rotary motion in the direction of the moving wood, and incapable of any appreciable lateral movement.

The combined saw and spreader are illustrated in the plan view, Figure 1, and the vertical section, Fig. 2, shows in detail the several parts hereinafter described.

I prefer to construct the spreader with an offset, D, in the drawing, having sufficient width to afford a supporting-surface to the lumber after it is cut, and acting in place of a roller. The flange C has a gradually-increasing thickness from the outer circumference toward the center on the side turned from the saw. Unless cast with the offset D, the spreading-plate should be provided with a short axle on the outer side to afford a means of attachment to the frame.

This attachment of the spreader to the saw-frame may be made in a variety of ways to secure the desired object. It may be cast solid, with a journal extending through a box, K, or may be detachable from its bearing. In the latter case I prefer to make the attachment in the following way: There is a circular opening through the center of the spreader-plate and offset, or short axle, if used, in the circumference of which is cut a screw-thread. Into this is screwed the journal H, having upon its outer end a cap or collar, or some equivalent device, lettered I in the drawing. The box K, within which the journal revolves, is supported in bearings attached to the saw-frame, and may be held rigid by a set-screw or other equivalent device. The cap or collar on the outer end of the journal operates to prevent lateral motion in the spreader and hold it steadily in its place.

My device may also be used in combination with a steadying-pin, as commonly used for steadying the saw; or the screw-journal above described, on which the spreader revolves, may be made hollow from end to end, as shown in Figs. 2 and 3, and a screw or pin, M, of wood or other suitable material, extended through from the outer end of the journal to the saw, and thus be easily adjusted to act as a steadying-pin in place of that commonly used.

It will be seen that my rotary spreader can be used on one or both sides of the saw, and either before or behind the saw-arbor.

What I claim as my invention, and desire to secure by Letters Patent, is—

1. The rotary spreader C, arranged and operating substantially as described.

2. A rotary spreader, in combination with the steadying-pin M, arranged and operating substantially as described.

DAVID K. OVERHISER.

Witnesses:
JAS. O. PARKER,
B. S. BENTLEY, Jr.